US006263383B1

(12) United States Patent
Lee et al.

(10) Patent No.: US 6,263,383 B1
(45) Date of Patent: Jul. 17, 2001

(54) KEYBOARD WEDGE SYSTEM CONFIGURED FOR DATA PROCESSING OVER A KEYBOARD HOOK

(76) Inventors: Glenn W. Lee, 1900 Towanda Dr., Plano, TX (US) 75074; Brent G. Robertson, 1414 Stoneboro La., Richardson, TX (US) 75082; Roger J. Colburn, 3312 Overland Dr., Plano, TX (US) 75023

( * ) Notice: Subject to any disclaimer, the term of this patent is extended or adjusted under 35 U.S.C. 154(b) by 0 days.

(21) Appl. No.: 09/198,127

(22) Filed: Nov. 23, 1998

(51) Int. Cl.[7] .............................. G06F 13/00; G06F 6/00; H04N 7/173
(52) U.S. Cl. .......................... 710/38; 710/31; 710/62; 710/67; 709/218; 235/462; 235/472
(58) Field of Search ............................. 710/62, 31, 38, 710/67; 235/462, 472; 709/218

(56) References Cited

U.S. PATENT DOCUMENTS

| | | | |
|---|---|---|---|
| 5,003,301 | * 3/1991 | Romberg | 345/168 |
| 5,258,604 | * 11/1993 | Behrens et al. | 235/462 |
| 5,557,095 | 9/1996 | Clark et al. | 235/462.15 |
| 5,659,800 | 8/1997 | Zhang et al. | 710/62 |
| 5,854,945 | * 12/1998 | Criscito et al. | 710/62 |
| 5,956,423 | * 9/1999 | Frink et al. | 382/187 |
| 6,015,091 | * 1/2000 | Rockstein et al. | 235/472.01 |
| 6,069,628 | * 5/2000 | Farry et al. | 345/348 |
| 6,115,678 | * 9/2000 | Lieb et al. | 702/122 |
| 6,148,331 | * 11/2000 | Parry | 709/218 |
| 6,152,369 | * 11/2000 | Wilz, Sr. et al. | 235/462.01 |

OTHER PUBLICATIONS

TAL Technologies, "Interpreting Serial Data," last modified Feb. 06, 1998, Copyright 1997, pp. 1–4, http://www.taltech-.com/swkb/intdata.htm.
Altek Instruments Ltd., "Keyboard Wedge," undated, pp. 1–3, http://www.hello.co.uk./altek/wedge.html.
Microsoft Corporation, "Win32 Hooks," Copyright 1997, pp. 1–17 http://www.microsoft.com/win32dev/ui/hooks32.htm.

* cited by examiner

Primary Examiner—Thomas Lee
Assistant Examiner—Tammara Peyton

(57) ABSTRACT

A method and apparatus for processing data in a computer system from a keyboard wedged device and a keyboard hook device. The keyboard wedge converts the data into standard keyboard keystrokes for transmission over a keyboard line. The keyboard hook provides a window through which scanned data is detected. Scanned data is distinguished from typed data using a software data processing application. The software is configured to identify scanned data based on characteristics of the scanned data. Processing functions are next performed on the detected data according to the particular application being used.

30 Claims, 8 Drawing Sheets

KEYBOARD WEDGE SYSTEM CONFIGURED FOR DATA PROCESSING OVER A KEYBOARD HOOK

BACKGROUND OF THE INVENTION

1. Field of the Invention

The invention relates generally to the field of keyboard wedge systems and processing of data streams, and more particularly to simplified configuration of barcode symbol scanning systems and processing of data streams therefrom.

2. Description of the Related Art

Barcode scanning systems have found an ever-increasing number of uses and applications. For example, barcoding has been utilized for inventory and warehousing applications, as well as with point of sale terminals. Many different types and complexities of barcodes systems have been used. A typical basic barcode symbol scanning system includes a barcode scanner, a decoder and a computer. The scanner and decoder have been utilized to retrieve information from barcodes for use by the computer system.

Conventional linear or one-dimensional barcodes have been in use since about 1970. The usefulness of such barcodes is limited by relatively small data capacity. To overcome this limitation, two-dimensional barcode symbologies have evolved. These symbologies are capable of encoding large amounts of data. For example, PDF417 barcode can encode up to 1800 ASCII characters or 2700 digits. However, in some applications only a portion of the scanned information is needed.

As part of a barcode reading system, a decoder is defined as an electronic package that receives a signal from the scanner, interprets the signal into meaningful data, and provides the data to other devices of the system. So far as known, there are three main types of decoders: wedge decoders, serial decoders and software decoders. Wedge decoders are systems that provide a decoding function for computer input. With keyboard wedge decoders, the data is decoded so that it appears as though it was manually typed or keyed directly into the computer. The basic function of keyboard wedge devices is conversion of scanned data into codes that are like those of keystrokes or keyboard data. Some keyboard wedge devices also have capability like that of software decoders to manipulate the scanned data, adding characters to the data stream or remapping the data stream altogether. However, to enable this data manipulation capability, the scanner must be manually pre-configured by scanning a multitude of special types of bar codes. This is a very complicated and time-consuming procedure.

Serial decoders are also external devices that connect into a communications or COM port of the personal computer. Typically, decoded scanners (i.e., scanners in which the decoder is integrated, usually into the handle of the scanner) are expensive.

Software wedges, located within the PC software, received the scanner data generally via the COM port. The received scanner data is then re-routed within the computer to the keyboard buffer. The data thus appears to other parts of the computer to have originated from the keyboard.

Many different types of scanning devices have been available. Scanning devices include wands, charge coupled device (CCD) scanners and laser scanners. Wand scanners tend to be the least expensive, followed by CCD scanners and laser scanners (the most expensive). Most scanning devices use a light emitting diode (LED) and a photo detector to scan barcodes. The light generated from the LED falls on the barcodes and is absorbed by the printed bars and reflected by the white spaces. The photodetector senses the reflected light and electro-optically converts the reflected light into a signal. The digitized signal is then sent to a decoder and converted into ASCII or other types of data characters.

Currently, there are more than 400 barcode symbologies in use. Each character in a barcode symbology is generally represented by a barcode in the form of a series of bars and spaces. Typically, each barcode symbol, as encoded, includes a quiet zone, start code or pattern, data characters, stop code and trailing quiet zone. Many symbologies support a check digit or digits to ensure data integrity. With such symbologies, the check digit or digits are usually located before the stop code. A barcode symbol is represented by a combination of barcode characters including the start/stop codes, quiet zones, data characters and check characters (as required by a particular symbology) that forms a complete, scannable entity.

SUMMARY OF THE INVENTION

Briefly a scanning system according to the preferred embodiment of the invention utilizes a decoded keyboard wedged device together with a keyboard hook device for system configuration and data manipulation. The keyboard wedge functions to accept data read from a barcode scanner and pass the data to a computer system as normal keyboard typed keystrokes. Thus, the keyboard wedge of the present invention converts data read by a scanner connected to a computer input into a format like that of data from the computer keyboard. The scanner data thus appears as though it were from the keyboard, allowing scanned data transmission over a standard keyboard line. The keyboard hook functions to intercept the data passed from the keyboard wedge to the computer. A processing application then can process the data passing through the keyboard hook. The processed data can then be sent to the computer for use in the desired application.

In operation, the scanning system of the present invention allows typed keystrokes from the keyboard to pass through the keyboard hook directly to the computer while the scanned data keystrokes are routed from the keyboard hook to the processing software. Thus, the keyboard hook provides a window to the keyboard data line, through which the processing software can distinguish typed from scanned keystrokes. Since only scanned data is processed, normal keyboard operation is not affected and system resources are conserved.

The processing software utilizes the keyboard hook to provide a number of data manipulation functions, including adding and clipping data characters, special formatting and parsing of data components. Furthermore, since the keyboard hook provides a path off of and onto the standard keyboard line, the processing software allows a user to selectively pass only those portions of data or formats thereof that are appropriate for a particular application. Further, because the processing is performed in software, the system can be easily configured to accept different scanned data decode formats without the need for different or additional system hardware.

In addition, the scanning system of the present invention provides an improved method of configuring the processing software. The processing software is configured to recognize what the scanned keystrokes look like. Scanned data is thus reliably detected and routed to the processing software while typed keystrokes are passed directly to the computer. Auto-configuration is achieved by supplying expected characteristics of the scanned data to the software, including average time between keystrokes and a minimum number of keystrokes over which average time is maintained. These characteristics represent threshold values that are used to test incoming keystrokes. Simplified configuration may also be achieved using a preamble/postamble protocol. In this mode, the software inspects data passing through the keyboard hook for special known characters which precede and follow the scanned data packet. Using either of the configuration modes, the present invention thus overcomes the need for time-consuming and complex manual scanner configuration.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF INVENTION

Figure 1:
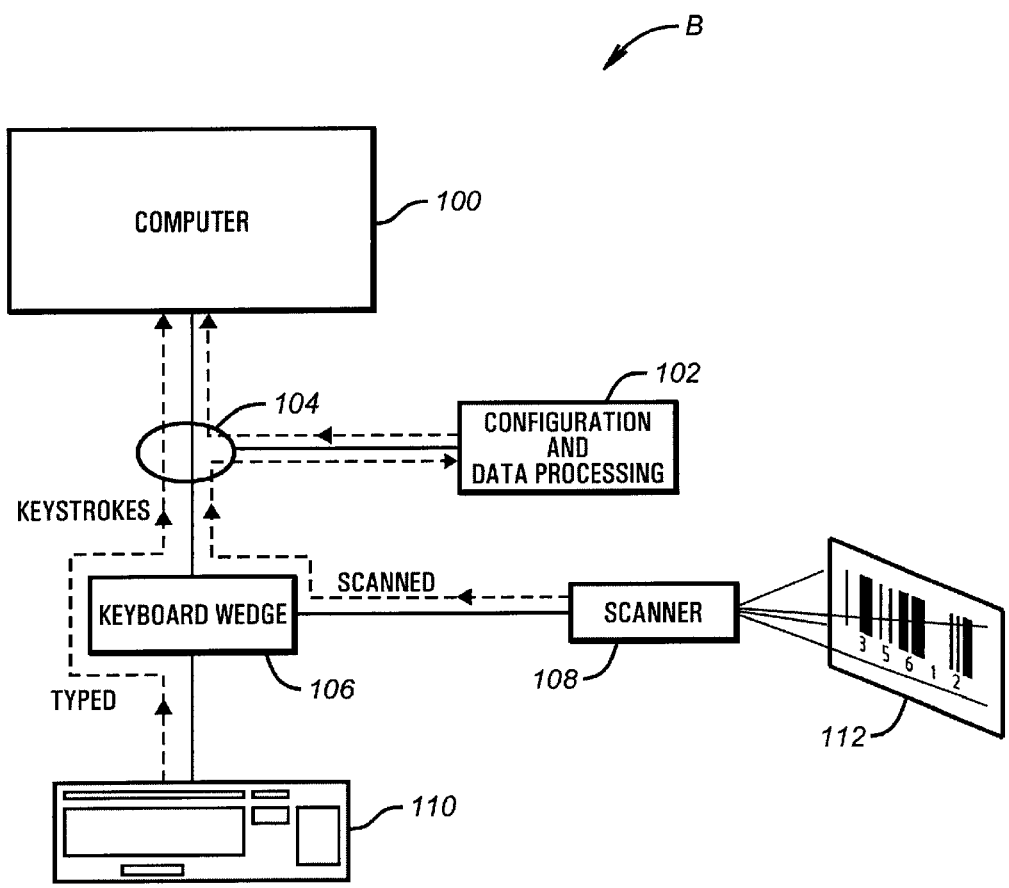
FIG. 1 is a block diagram of an example computer system capable of performing scanned data processing and manipulation in accordance with the present invention.

Referring now to FIG. 1, a block diagram of an exemplary barcode scanning system B in accordance with the present invention is shown. Although a barcode scanning system is shown by way of example, the present invention can be used with other devices capable of generating data streams. The barcode scanning system B employs a keyboard wedge 106 that receives both scanned data from a barcode scanner 108 and typed data from a conventional computer keyboard 110. The keyboard wedge 106 is physically introduced or inserted via software between the system keyboard 110 and the computer console 100.

The computer 100 may be any of several types of conventional personal computers which are commercially available. In the preferred embodiment, the computer 100 preferably operates under a Windows™ operating system available from Microsoft Corporation, although other operating systems may be used.

The wedge 106 functions to convert scanned data into keystrokes such that the computer 100 is enabled to accept the scanned data as data in a form compatible with that of the keyboard. Therefore, the keyboard wedge 106 is transparent to the computer 100. The keyboard wedge 106, can further be implemented in the form of a hardware wedge or a software wedge.

In a system using a hardware wedge the keyboard 110 and the scanner 108 are physically plugged directly into the electronic gating circuitry of the keyboard wedge 110 which is then plugged into the keyboard port of the computer. A software wedge accomplishes the same result as a hardware wedge but using program codes rather than gating circuitry. Using a scanner having an RS232 interface plugged into a peripheral device communication inputs of the computer or PC, such as the COM port, the software wedge takes the scanner data via the COM port, and re-routes it within the computer or PC to the keyboard buffer. The computer thus treats the scanned data as if it was typed on the keyboard.

The keyboard wedge 106 passes typed keystrokes directly to the PC while scanned data from a scanner 108 is first converted into keystrokes and then passed onto the keyboard line. Thus, typed data on a keyboard is sent to the computer as usual. When a barcode, or other symbology, 112 is scanned, the barcoded characters are converted to keyboard "key codes" by the keyboard wedge and then sent along the keyboard line. Thus, scanned data from the scanner 108 is converted by the keyboard wedge 106 into keystrokes such that the scanned data is in the same format as typed data.

The barcode scanning system B of FIG. 1 includes a keyboard hook 104 coupled to a configuration and data processing filter function 102. The keyboard hook 104 is provided in the Windows™ operating system. The keyboard hook 104 intercepts events such as keystrokes designated by the user before they reach the application software. In the present invention, as described below, keystroke and scanned data are differentiated by various characteristics in both the keyboard hook 104 and the configuration and data processing filter function 102. If the data are indicated as data from the scanner 108, the configuration and data processing filter function 102 is given a path through which data may be rerouted prior to reaching the computer 100. If the data are typed keystrokes, the data are passed to the computer without additional processing. The keyboard hook 104 and the configuration and data processing filter function 102 operate together to intercept all scanned data to be preprocessed while directly passing typed keystrokes from keyboard 100 directly on to the computer 100 without preprocessing.

The configuration data processing filter function 102 is capable of detecting data streams converted from scanned data as distinct from keystrokes from typed data. Thus, through software, the barcode scanning system B is able to automatically detect scanned data on a keyboard line from typed data on the same keyboard line and then process this scanned data into the format desired for the application in use. The data processing provides selective processing and manipulation of data streams from the barcode scanner and other standard and high capacity symbol scanners. For example, as described in greater detail in reference to FIG. 8, special formatting of data, adding and removing data characters and parsing the data stream into fields may be perform to alter the scanned data into a format required by a specific application. This processed data then is sent back through the keyboard hock to the computer 100, where it is treated as normal typed data from a keyboard 110.

Figure 2:
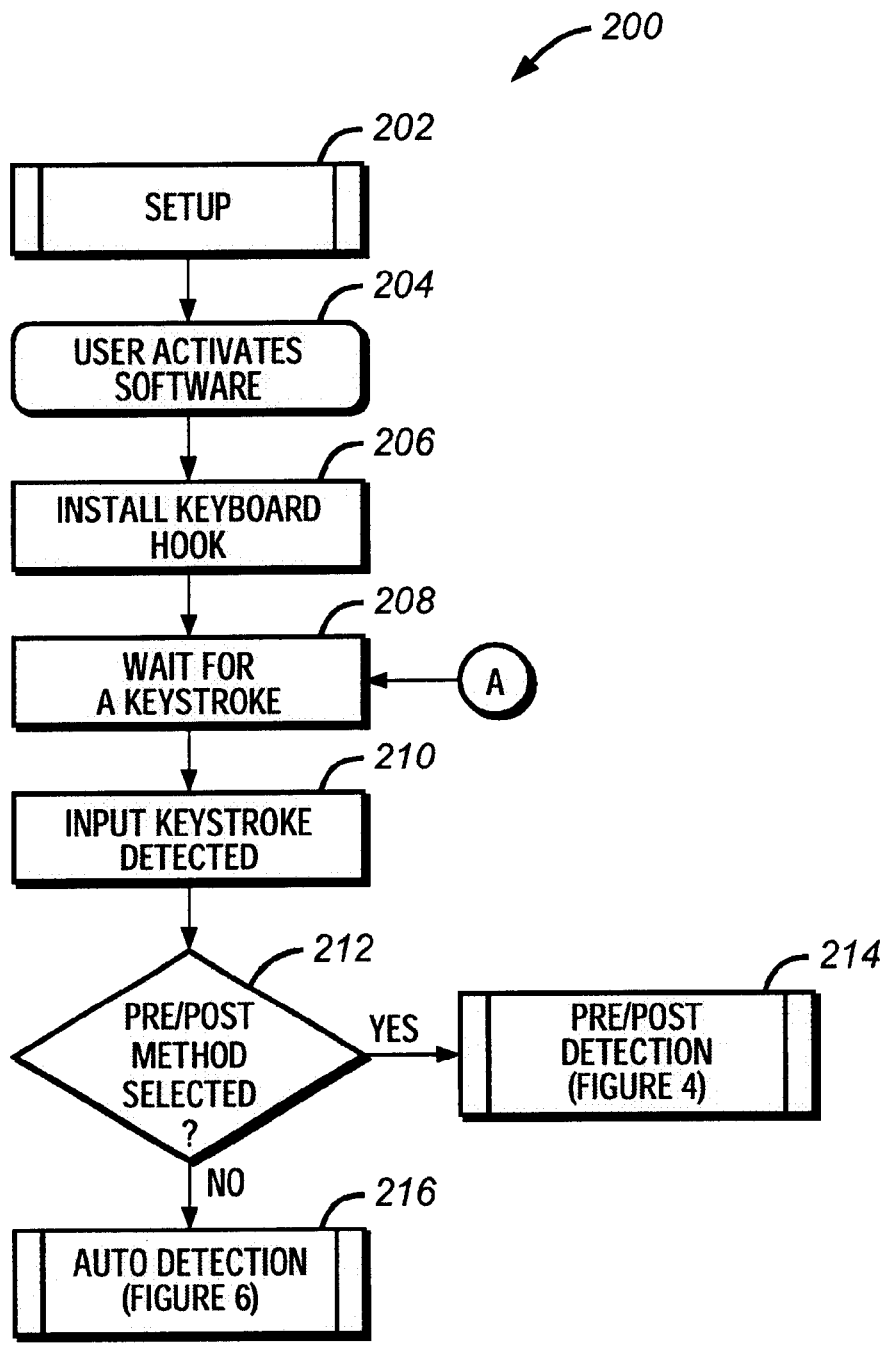
FIG. 2 is a flowchart showing a process for processing scanned data over a computer keyboard line in the system of FIG. 1.

Referring to FIG. 2, a flowchart showing the setup function for the barcode scanning system B according to the present invention as shown. The setup function is called at step 202. The function commences in step 204 when the user activates the software. This activation can be done either manually by the user or automatically when the user inputs data via either the scanner 108 or the keyboard 110. Next in step 206, the system installs a keyboard hook available from the operating system. As mentioned, the keyboard hook 104 intercepts incoming data before it goes to the active application in the computer 100.

The Windows™ operating system of computer 100 allows software to set a hook into the keystroke processing chain by means of the keyboard hook. As is known in the art using keyboard hooks, the hook can be either a system-wide hook or a thread specific hook where it intercepts keystrokes from all windows or from a specific window, respectively. After the hook is installed in step 206, the setup process then waits for a keystroke at step 208 until an input keystroke is detected in step 210.

At this point, a detected keystroke can be either typed data from the keyboard 110 or scanned data from the scanner 108. Because the keyboard wedge 106 converts the scanned data into keystrokes, the data stream entering the keyboard hook 104 is classified through use of the configuration and data processing filter function 102 as either scanned or typed data. In other words, the data stream to computer 100 from the keyboard wedge 106 is comprised of characters from the same character map, regardless of whether it is scanned data or typed data.

Figure 4:
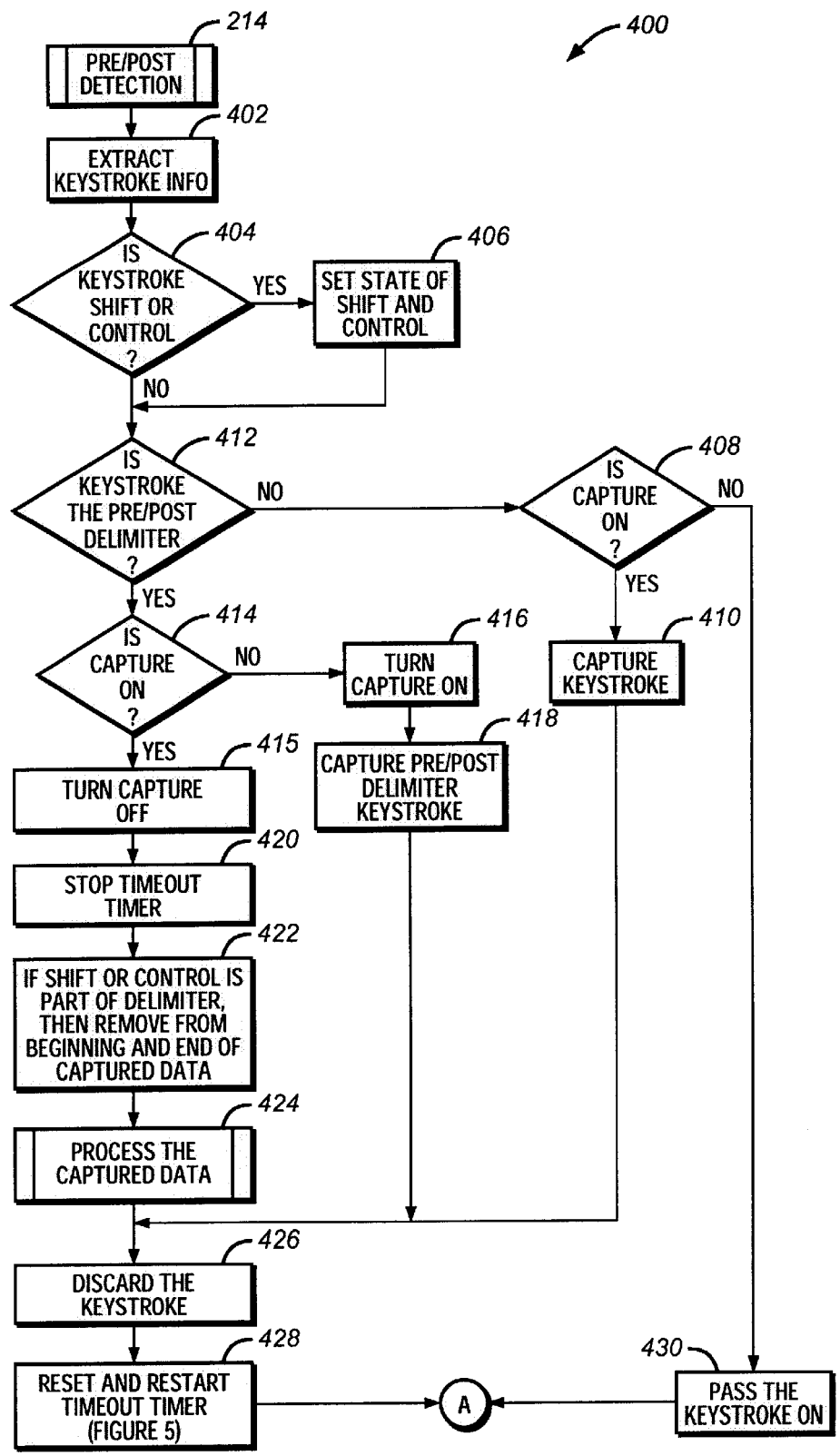
FIG. 4 is a flowchart illustration providing further details of the Pre/Post detection mode of the process of FIG. 2.
Figure 5:
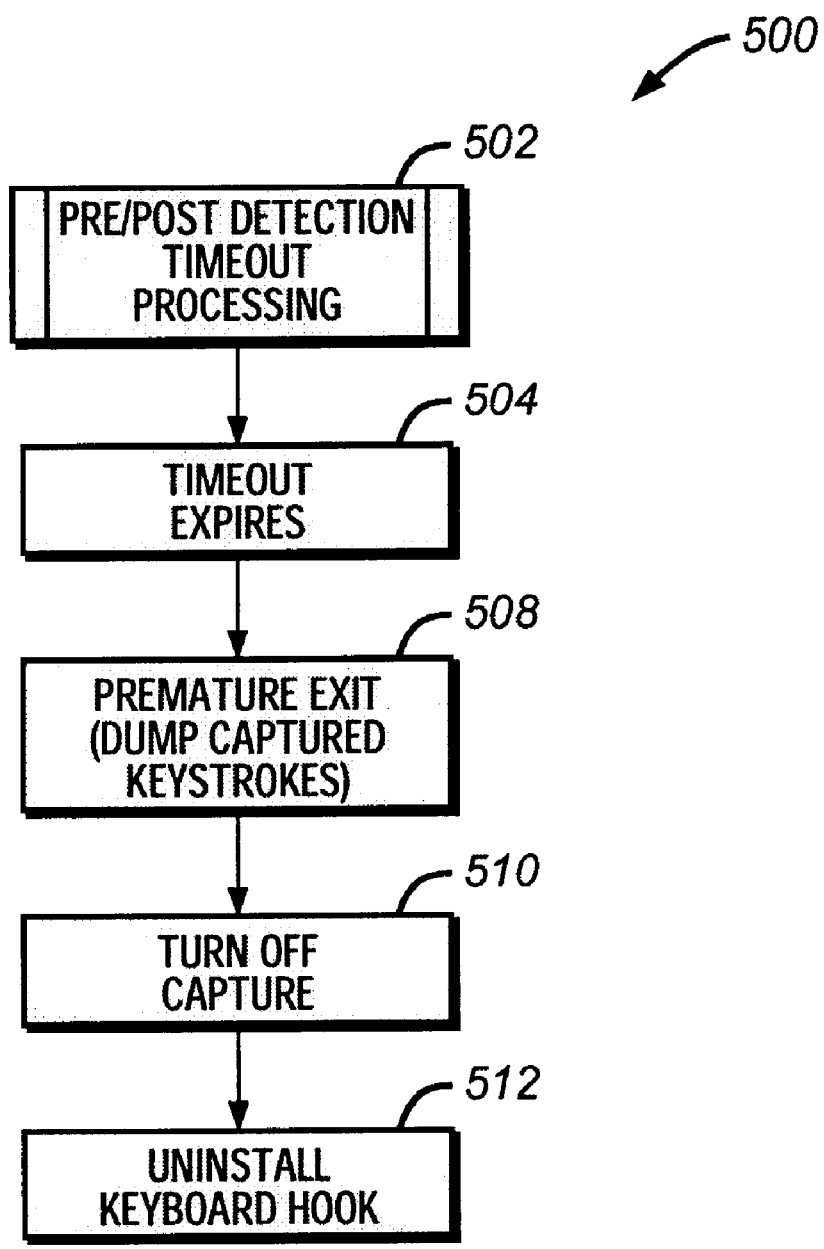
FIG. 5 is a flowchart illustration of timeout processing in the Pre/Post detection mode.
Figure 6:
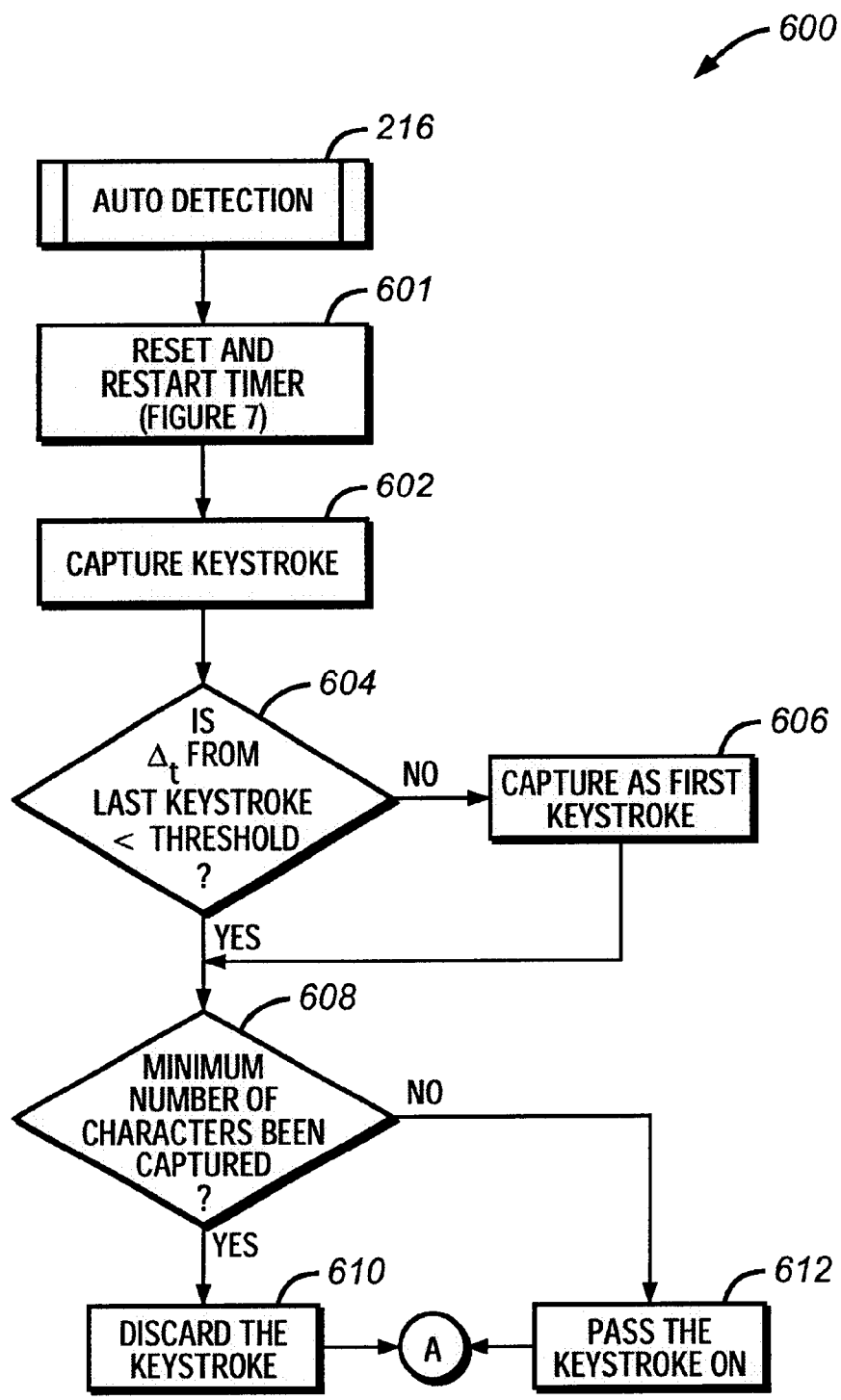
FIG. 6 is a flowchart illustration providing further details of an Auto detection mode of the process of FIG. 2.
Figure 7:
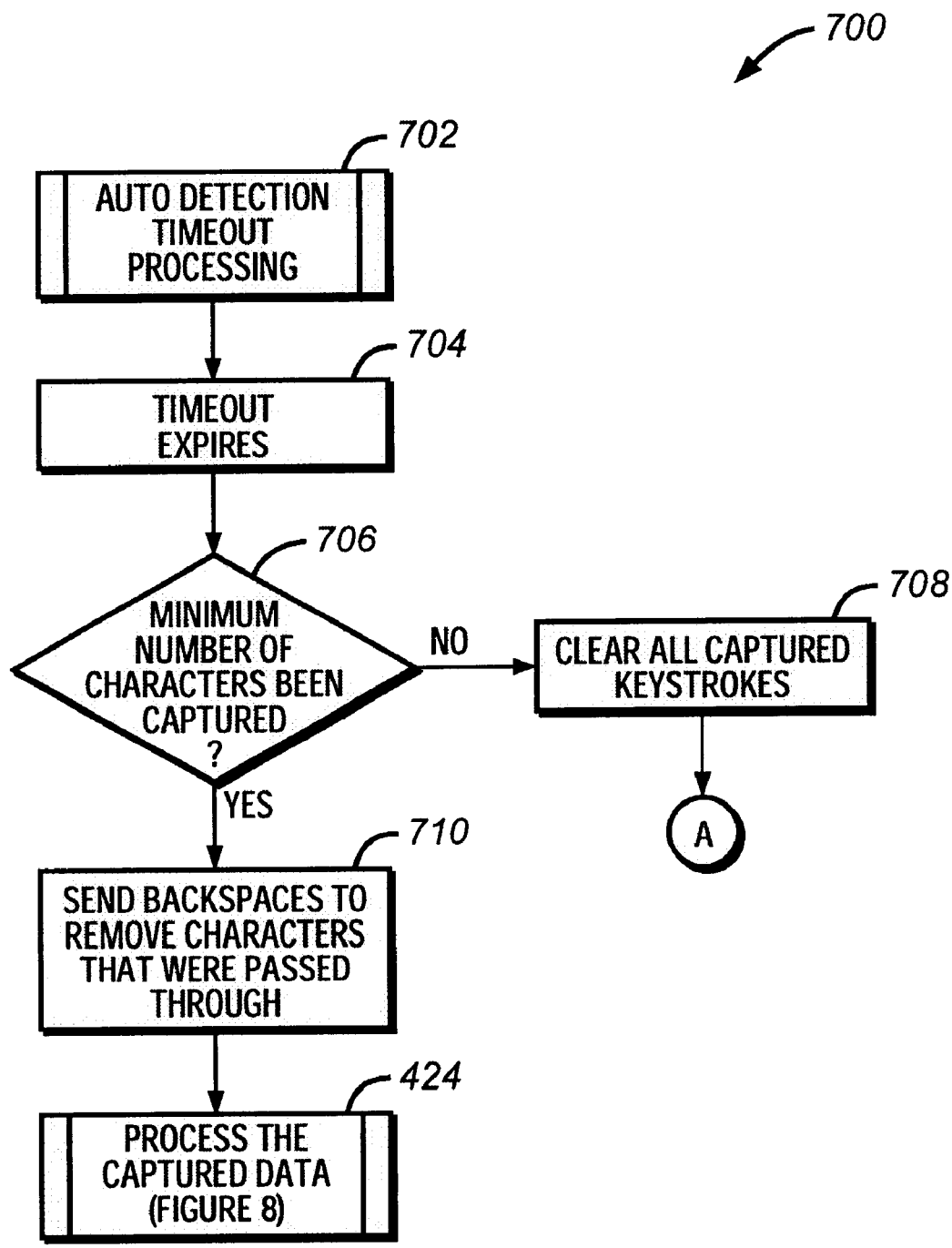
FIG. 7 is a flowchart illustration of timeout processing in the Auto detection mode.

The setup process of FIG. 2 then determines which user defined detection mode has been selected. At step 212, the system determines whether the Pre/Post method has been detected. If so, the set up routines calls the Pre/Post detection routine 214 (FIGS. 4 and 5). If not, the setup function 200 calls an auto detection mode at step 216 (FIGS. 6 and 7).

Figure 3A:
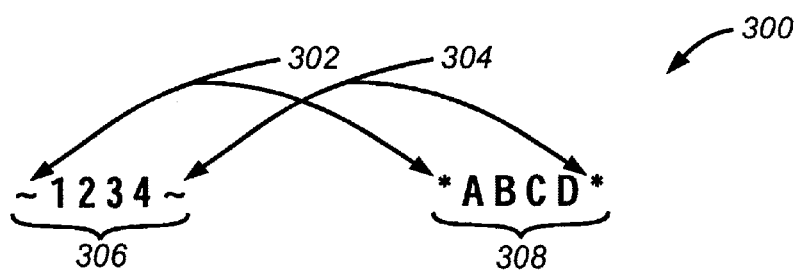
FIGS. 3A–3C are illustrations showing formats for typical data inputs.
Figure 3B:
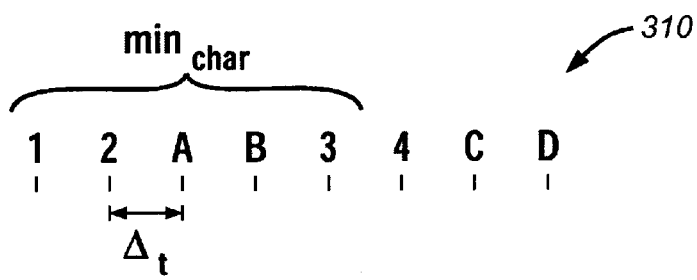
Figure 3C:
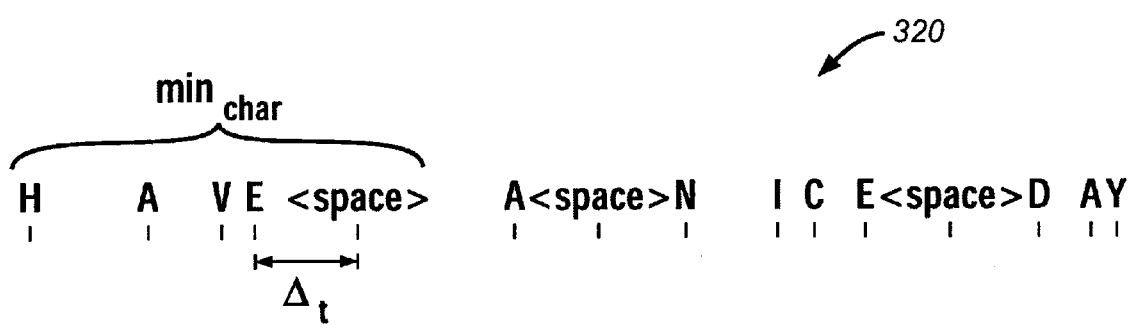

FIGS. 3A–3C illustrate typical data stream fragments of the data exiting the keyboard wedge 106 on the keyboard line, representing either typed data or converted scanned data. Although the scanned data illustrated in FIGS. 3A and 3B are shown by way of example to originate from one-dimensional barcodes, the present invention can also be used with two-dimensional barcoding and other symbologies as well.

Because the typed data and the scanned data characters are based on the same character map, their differences are not altogether apparent. The configuration and data processing filter function 102 directs itself to various characteristics which identify converted scanned data. FIG. 3A illustrates scanned data streams 306 and 308 having a preamble and postamble character 302 and 304, respectively, attached to the beginning and end, respectively, of the data stream. In this configuration, the keyboard wedge 106 or the scanner 108 itself independently attaches the preamble 302 and postamble delimiters 304 to the data streams 306 and 308. In this way, the Pre/Post detection mode 214 detects scanned data by looking for a preamble delimiter 302. After the preamble delimiter 302 is detected, the characters which follow comprise the data stream of scanned data until a postamble delimiter 304 is detected. In this mode, accuracy depends on the selection of the preamble and postamble delimiters 302 and 304. These delimiters are preferably selected as characters which are rarely if ever used as typed data.

The barcode scanning system B is also capable of detecting scanned data without the use of preamble and postamble delimiters. FIG. 3B shows a typical data stream 310 of converted scanned data from scanner 108, the converted data stream representing the barcode 112, or other symbology. It is important to notice that characters making up the data stream 310 from a scanning device 108 exhibits a consistent time interval, or period $\Delta_t$, between which the individual characters are transmitted. Further, this period, $\Delta_t$, is maintained over a user defined minimum number of characters, $min_{char}$. Typed data, however, does not exhibit such a consistent pattern. As shown in FIG. 3C, the characters of the typed data stream 320 are transmitted having largely varying time spacing periods between which adjacent characters are transmitted. Specifically, unlike the scanned data stream 310, the typed data stream 320 does not maintain the consistent period, $\Delta_t$, over a user defined minimum number of characters, $min_{char}$ that is present in data from the scanning device.

Therefore, depending on the mode selected, the configuration and data processing filter function 102 intercepts scanned data that matches the user defined scanned data characteristics. If the Pre/Post detection mode 214 is selected, the system detects the user defined preamble and postamble delimiters to recognize the beginning and end, respectively, of a scanned data stream. If a preamble delimiter is not detected, the data on the keyboard data line is not scanned data and is passed without processing directly to the computer 100.

Alternatively, when the Auto Detection mode 216 is selected, the system uses user-defined values that are typical characteristics exhibited by scanned data distinguished from typed keystrokes. For example, in the preferred embodiment, the Auto Detection mode 216 intercepts data when a data stream exhibits a consistent predefined transmission frequency, or a time period, $\Delta_t$, between the transmission of contiguous characters, that is maintained over a predefined number of characters. If the frequency of the data stream is erratic or is consistent over less than the predefined number of characters, the data is passed without processing directly to the computer 100. Although the time period, $\Delta_t$, and the value representing the minimum number of characters over which time $\Delta_t$ be maintained is shown by example, the present invention can also utilize other characteristics that uniquely define scanned data to distinguish scanned data from typed data.

Referring now to FIG. 4, a flowchart is provided detailing the Pre/Post detection mode of step 214 of FIG. 2. After a call to the Pre/Post detection routine 214, the function commences at step 402 where the keystroke information is extracted, such as the scan code, the current press state, the old state, etc. The detection process continues in step 404 where it is determined if the keystroke is a SHIFT or a CONTROL. If so, the state of the SHIFT and CONTROL setting is set. It is next determined at state 412 whether the keystroke is the assigned Preamble or Postamble delimiter 302 or 304. If the keystroke is the assigned pre or post delimiter, it is determined at step 414 whether the capture setting is activated. If capture is not activated, then the capture setting is activated at step 416. The Pre- or Post-delimiter keystroke is then captured at step 418.

Therefore, a scanned data stream 300 is detected through the keyboard hook 104 when the configuration data processing filter function 102 first detects the assigned preamble delimiter 302 in step 412. Because this is the preamble delimiter, the capture setting has not been activated prior to its detection. By activating the capture setting at 416, the characters following the preamble delimiter 302 are captured in step 418. At step 426, after storing the preamble delimiter in step 418 as a captured keystroke, the system then discards that keystroke thus preventing it from passing to the computer 100. The detection process then, at step 428, resets and restarts the timeout timer and then loops back to state 208 and 210 where it waits for the detection of the next keystroke.

Upon detection of a next character following the preamble character 302, at step 412, it is again determined whether this keystroke is the preamble or postamble delimiter. In a valid data stream, the next character is not either a preamble or postamble delimiter, instead the next character is characters within the data stream 306 or 308. Therefore, at step 408, the capture having been activated from step 416, the next character is captured at step 410. After the keystroke is captured, the system then at step 426 discards that keystroke to prevent a keystroke from passing through computer 100. It is to be noted however, the keystroke at this point has been stored as captured data. The foregoing described process of FIG. 4 repeats itself, capturing subsequent characters until a postamble delimiter 304 signals the end of the scanned data stream.

After a preamble delimiter has been detected in step 412 and after subsequent keystrokes of the data stream 306 or 308 have been captured in step 410, a postamble delimiter is then detected at step 412. The postamble delimiter 304 tells the system that the data stream is now complete. Since the capture setting was turned on to capture the preamble delimiter keystroke at step 418 and the subsequent data stream keystrokes at 410, the process proceeds to step 415 where the capture setting is deactivated. The timeout timer is then stopped at step 420 and a SHIFT or a CONTROL is removed from the beginning and end of the captured data if either were part of the delimiter at step 422. At this point the stored captured data, now representing a complete data stream 306 or 308, is processed at step 424. Thus, the Pre/Post process detects and captures the scanned data while passing keystrokes typed from a keyboard. This captured data is then processed at step 424 according to the particular application for which the scanned data is intended.

Figure 8:
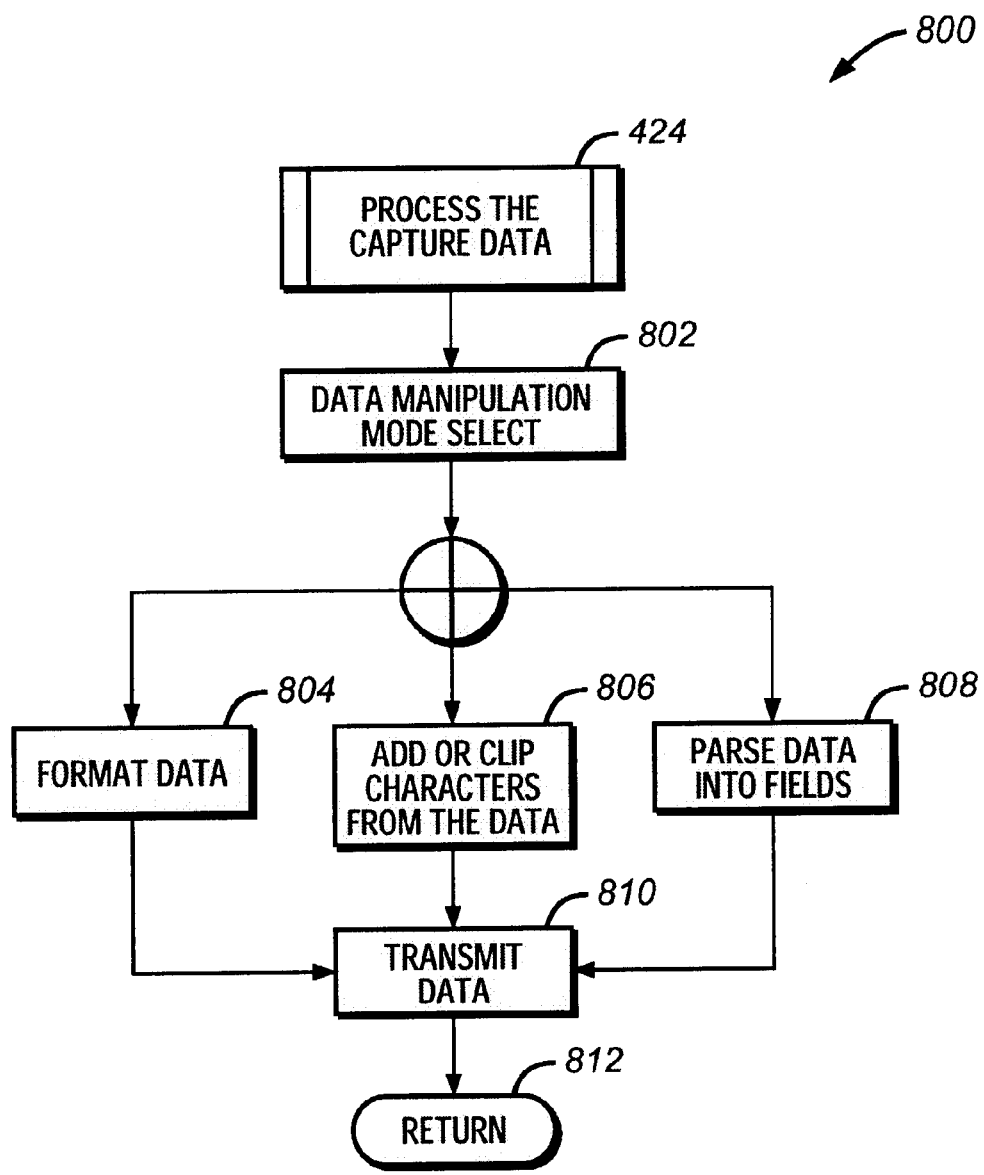
FIG. 8 is a flowchart illustration of processing of scanned data in accordance with the present invention.

Each time a character is captured, it is discarded at step 426, preventing it from passing to the computer 100. In this way, only the scanned data that has been captured and later processed, discussed in detail with reference to FIG. 8, is sent to the computer. However, as discussed, all typed data is passed directly to the computer 100 without being routed to the processing function 424. Therefore, in the Pre/Post detection mode, only typed keystrokes and captured and processed data streams are passed to the computer 100. At step 428 the timeout timer is reset and restarted while the process waits for an additional keystroke at step 208.

Alternatively, when a preamble delimiter 302 has not been detected, capture is not activated. Instead, the system passes the keystroke from keyboard 110 on to the computer 100 at step 430 and returns to step 208 where it again waits for the next keystroke. This path is taken for normally typed keystrokes from keyboard 110.

Referring now to FIG. 5, a flowchart is provided detailing the timeout processing during Pre/Post detection mode. After a keystroke is captured, a timer is set at step 428 (FIG. 4). The timer protects against inadvertent use of the preamble and postamble character when typing. The Pre/Post detection mode timeout processing is called at step 502. The processing commences when a timeout expires at step 504. The software then performs a premature exit at step 508, in which the captured keystrokes are dumped and are not passed to the computer 100. The capture setting is then deactivated at step 510 and the software uninstalls the keyboard hook at step 512.

Referring now to FIG. 6, the Auto Detection mode 216 of FIG. 2 is shown in greater detail. Step 216 commences by resetting and restarting the timer. At step 602, the keystroke is captured. It is then determined at step 604 whether the time period $\Delta_t$ (shown in FIGS. 3B and 3C) from the last received keystroke is less than the predefined $\Delta$ threshold. If $\Delta_t$ from the last keystroke is greater then the predefined $\Delta$ threshold, then the previously captured keystrokes from step 602 are discarded and the current keystroke becomes the first captured character at step 606. Alternatively, if the period $\Delta_t$ from the last received keystroke is less than the predefined $\Delta$ threshold, the previously captured keystrokes and the current captured keystroke of step 602 remain unmodified.

Then, at step 612, if the minimum number of characters, $min_{char}$ (FIGS. 3B and 3C) have not been captured at step 608, the Auto Detection process 600 passes the keystroke on to the active application and then waits for the next keystroke at step 208. However, if the minimum number of characters, $min_{char}$, have been previously captured, the auto detection process of FIG. 5 discards this keystroke, thus prevents it from passing to the computer 100, while continuing to store the captured keystrokes. The system then waits for an additional keystroke at step 208. Therefore, by selecting the value of $min_{chrs}$ and $\Delta$ threshold at appropriate settings depending on data context and usage experience, scanned data with the present invention can be distinguished from typed data for the computer.

As discussed with reference to FIGS. 3B and 3C, scanned data exhibits a more consistent pattern of timing between the transmission of each character than that of typed data. By setting the $\Delta$ threshold to closely approximate the actual period, $\Delta_t$, of the scanner output, the data streams from the scanner 108 can be identified. Since it is possible that over a small number of characters, typed data may exhibit a similar period $\Delta_t$ between each keystroke, the value of $min_{char}$ is included to specify the number of characters over which $\Delta_t$ is tested. The larger the value of $min_{chars}$, the more unlikely that typed data will exhibit a consistent $\Delta_t$ that is close to the redefined $\Delta$ threshold for scanner data.

Referring to FIG. 7, the timeout processing for the auto detection mode 216 is shown in more detail. Timeout processing commences after a timeout expires at step 704. This occurs when the system encounters a "quiet time," during which no activity is present on the data line. Specifically, the "quiet time" is the period of time after a scan is complete when there is no keystroke activity either from the keyboard or from the scanner. When this "quiet time" duration is complete, the Timeout expires and processing begins. The length of the "quiet time" is some multiple of the $\Delta$ threshold time.

Processing continues at step 706 where it is determined whether the minimum number of characters, $min_{char}$, have been captured by the auto detection step of 216. If $min_{chars}$ has not been met, all captured keystrokes are then cleared at step 708 and the configuration and data processing filter function 102 continues to wait for additional keystrokes at step 208. On the other hand, if $min_{char}$ has been met, backspaces are sent to the active application in step 710 to remove the characters that were passed to the computer 100 in step 612. The number of backspaces sent is equal to the value of $min_{chars}$. Therefore the Timeout processing 702 detects and captures the data as scanned data when a specified number of characters, $min_{char}$, are received. If not, the data is interpreted as keystroke data from the keyboard. The captured scanned data is then processed at step 424. Thus, the Auto Detection process detects and captures the scanned data while passing keystrokes typed from a keyboard. This captured data is then processed at step 424 according to the particular application for which the scanned data is intended.

Referring now to FIG. 8, the processing step 424 of FIGS. 4 and 7 is shown in more detail. An exemplary processing step 424 commences following selection of the appropriate data manipulation mode at step 802. According to an exemplary embodiment according to the invention, any number of data manipulation modes can be implemented. For example in step 804, captured data may be converted into a specific format. For example, a continuous stream of number characters may be formatted into a telephone number format by adding parenthesis around the first three numbers and inserting a dash after the sixth character. Further, processing may add or clip characters from the beginning and end of the data stream at step 806. In addition, in step 808, portions of a data stream may be parsed into separate data fields. After the selected data manipulation has been completed, the processed data is then transmitted to the computer 100 through the keyboard hook 104 at step 810. The process then returns at step 812 to the function that called the processing 424.

Therefore, it can be seen that the scanning system according to the preferred embodiment of the present invention utilizes a decoded keyboard wedge device together with a keyboard hook device for system configuration and data manipulation. The keyboard wedge device allows the scanner device to be connected directly to a computer and transmit data as keystrokes over a standard input line to a computer. The keyboard hook then allows the configuration and data processing function filter to intercept data streams originating from scanned data, while passing typed keystrokes directly to the computer. Because this is implemented in software, a greater range of data manipulation capabilities is provided. In this way, the system is not limited to a specific hardware device configuration, as new software can be added if a new kind of data manipulation is required.

In addition, configuration according to an embodiment of the present invention easily and automatically detects scanned data and distinguishes data streams originating from a scanner from data streams from typed keystrokes. The automatic configuration overcomes the need for traditional manual prescanning of special barcodes. Finally, the data processing of the scanned data provided by the keyboard wedge 106 and the keyboard hook 104 in tandem provides selective processing and manipulation of data streams scanned from high capacity barcode symbologies.

Finally, although a barcode scanning system is shown by way of example, the present invention can be used with other devices capable of generating data streams.

The foregoing disclosure and description of the invention are illustrative and explanatory thereof, and various changes in the number of variables, number of parameters, order of steps, data types, code elements, connections, components, and materials, as well as in the details and types of the illustrated hardware and software and construction and method of operation may be made without departing from the spirit of the invention.

What is claimed is:

1. A method for transferring data to a computer over a computer data line, the data generated by either a keyboard or an external device, comprising the steps:

receiving data from the keyboard and the external device at a same input, data from the external device matching a format of data from the keyboard;

detecting whether the data is from the keyboard or the external device;

passing the data from the computer data line to a keyboard processing it in the computer when the detected data is from the keyboard; and intercepting the data when the detected data is from the external device the intercepting step comprising the steps of:

constructing an external device data configuration representing the data from the external device, using characteristics of a data stream that are typical for the external device;

detecting data on the computer data line according to the external device data configuration;

intercepting the data on computer data line that matches the external device data configuration; and passing the intercepted data to an external device processing unit in the computer.

2. The method of claim 1, wherein the step of passing further comprises:

passing the data directly to the computer without processing the data when the detected data is from the keyboard.

3. The method of claim 1, further comprising:

processing the intercepted data.

4. The method of claim 1, wherein the characteristics that are typical for the data from the external device include:

a time for period between each transmitted character of the data; and a minimum number of characters over which the time period is maintained.

5. The method of claim 1, wherein the characteristics that are typical for the data from the external device include:

at least one delimiting character that represents the beginning of a data packet; and at least one delimiting character that represents the end of the data packet.

6. The method of claim 1, further comprising the steps:

manipulating the intercepted data; and sending the manipulated data on the computer data line to the computer.

7. The method of claim 1, wherein the external device is a barcode scanner.

8. The method of claim 1, wherein the computer data line is a standard keyboard data line.

9. A method of detecting data from an external device on a computer data line, the computer data line transmitting data from both a keyboard device and the external device, the method comprising:

constructing an external device data configuration representing the data from the external device;

detecting data on the computer data line according to the external device data configuration, data from the external device matching a format of data from the keyboard; and intercepting the data on the computer data line using a keyboard hook when the data matches the external device data configuration.

10. The method of claim 9, wherein the step of constructing is performed using characteristics of a data stream that are typical for the data from the external device.

11. The method of claim 10, wherein the characteristics that are typical for the data include:

a time period between each transmitted character of the data; and a minimum number of characters over which the time period is sustained.

12. The method of claim 10, wherein the characteristics for the data include:

at least one delimiting character that represents the beginning of a data packet; and at least one delimiting character that represents the end of a data packet.

13. The method of claim 9, further comprising the steps:
manipulating the data; and
sending the manipulated data on the computer data line to a computer.

14. The method of claim 9, wherein the external device is a barcode scanner.

15. The method of claim 9, wherein the computer data line is a standard keyboard data line.

16. A computer system for transferring data from an external device over a keyboard data line in a format matching the format of computer data generated by a keyboard for the computer, the system comprising:
an external device for generating a data stream;
a host computer system, comprising:
 a processor;
 a keyboard;
 a processor readable storage medium coupled to the processor;
 a keyboard data line coupled to the processor for transmitting data to the processor;
 a receiver for receiving a data stream generated by the keyboard and the external device at a same input, data from the external device matching a format of data from the keyboard;
 a detector for detecting whether the data is from the keyboard or from the external device; and
 software code in the processor readable storage medium executed by the processor to perform the steps of:
  passing the data to the host computer system when the detected data is from the keyboard; and
  intercepting the data when the detected data is from the external device, the intercepting step comprising the steps of:
   constructing an external device data configuration representing the data from the external device, using characteristics of a data stream that are typical for the external device;
   detecting data on the computer data line according to the external device data configuration;
   intercepting the data on computer data line that matches the external device data configuration; and
   passing the intercepted data to an external device processing unit in the computer.

17. The computer system of claim 11, wherein the step of passing further comprises:
passing the data directly to the computer without processing the data when the detected data is from the keyboard.

18. The computer system of claim 16, wherein the software code further comprises code for directing the host computer system to perform the further step of:
processing the intercepted data into a format required by an application when the detected data is from the external device.

19. The computer system of 16, wherein the characteristics that are typical for the data include:
a time period between each transmitted character of the converted data; and
a minimum number of characters over which the time period is maintained.

20. The computer system of claim 16, wherein the characteristics that are typical for the data include:
at least one delimiting character that represents the beginning of a data packet; and
at least one delimiting character that represents the end of a data packet.

21. The computer system of claim 16, wherein the external device is a barcode scanner.

22. A data detection and processing system for sending data generated by an external device to a computer system over a computer keyboard data line in a format matching the format of data generated by a keyboard for the computer system, the data detection and processing system comprising:
an external device for generating a data stream;
a readable storage medium;
a receiver for receiving a data stream generated by the keyboard and the external device at a same input, data from the external device matching a format of data from the keyboard;
a detector for detecting whether the data is from the keyboard or from the external device; and
software code in the readable storage medium to perform the steps of:
 passing the data to the computer system when the detected data is from the keyboard; and
 intercepting the data when the detected data is from the external device, the intercepting step comprising the steps of:
  constructing an external device data configuration representing the data from the external device, using characteristics of a data stream that are typical for the external device;
  detecting data on the computer data line according to the external device data configuration;
  intercepting the data on computer data line that matches the external device data configuration; and
  passing the intercepted data to an external device processing unit in the computer.

23. The data detection and processing system of claim 22, wherein the step of passing further comprises:
passing the data directly to the computer system without processing the data when the detected data is from the keyboard.

24. The data detection and processing system of claim 22, wherein the processor readable storage medium further comprises:
software code for directing the host data detection and processing system to perform the step of:
 processing the intercepted data into a format required by an application when the detected data is from the external device.

25. The data detection and processing system of claim 22, wherein the characteristics that are typical for the data from the external device include:
a time period between each transmitted character of the converted data; and
a minimum number of characters over which the time period is maintained.

26. The data detection and processing system of claim 22, wherein the characteristics that are typical for the data from the external device include:
at least one delimiting character that represents the beginning of a data packet; and
at least one delimiting character that represents the end of a data packet.

27. The data detection and processing system of claim 22, wherein the external device is a barcode scanner.

28. The method of claim 1, wherein the intercepting step is accomplished through the use of a keyboard hook.

29. The computer system of claim 16, wherein the intercepting step is accomplished through the use of a keyboard hook.

30. The data detection and processing system of claim 22, wherein the intercepting step is accomplished through the use of a keyboard hook.

* * * * *